(12) United States Patent
Romeis

(10) Patent No.: US 12,537,388 B2
(45) Date of Patent: Jan. 27, 2026

(54) METHOD FOR CONTROLLING AN ENERGY NETWORK, AGENT DEVICE, NETWORK CONTROL ARRANGEMENT AND SYSTEM

(71) Applicant: Siemens Aktiengesellschaft, Munich (DE)

(72) Inventor: Christian Romeis, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 549 days.

(21) Appl. No.: 17/953,526

(22) Filed: Sep. 27, 2022

(65) Prior Publication Data
US 2023/0098127 A1   Mar. 30, 2023

(30) Foreign Application Priority Data
Sep. 27, 2021   (EP) ...................................... 21199147

(51) Int. Cl.
*H02J 13/00* (2006.01)
*H02J 3/38* (2006.01)

(52) U.S. Cl.
CPC ........ *H02J 13/00022* (2020.01); *H02J 3/381* (2013.01); *H02J 2300/24* (2020.01)

(58) Field of Classification Search
CPC .. H02J 13/00022; H02J 3/381; H02J 2300/24; H02J 3/0012; H02J 13/00002; H02J 2203/10; Y02E 40/70; Y02E 60/00
See application file for complete search history.

(56) References Cited

U.S. PATENT DOCUMENTS

| 5,113,498 A * | 5/1992 | Evan ......................... G06F 3/05 710/8 |
| 10,063,052 B2 * | 8/2018 | Weckx ................... G05B 15/02 |

(Continued)

FOREIGN PATENT DOCUMENTS

WO   2014057133 A2   4/2014

OTHER PUBLICATIONS

"Siguard PDP—Grid Monitoring using Synchrophasors", Siemens AG, 2021.
(Continued)

*Primary Examiner* — Ziaul Karim
(74) *Attorney, Agent, or Firm* — Laurence A. Greenberg; Werner H. Stemer; Ralph E. Locher

(57) ABSTRACT

A method for controlling an energy network includes transmitting a respective offer message by using a plurality of agent devices, each agent device being assigned to a sub-network of the energy network, and each offer message indicating a subnetwork-specific measure for controlling the respective subnetwork and a period for which the subnetwork-specific measure is offered. A network control arrangement is used for receiving the offer messages, and identifying an undesirable network state of the energy network. A subnetwork-specific measure is selected from the plurality of subnetwork-specific measures, and an acceptance message is transmitted to that agent device which sent the offer message containing the selected subnetwork-specific measure by using the central network control arrangement. A corresponding agent device, a corresponding network control arrangement and a system including an agent device and a network control arrangement are also provided.

14 Claims, 1 Drawing Sheet

(56) References Cited

U.S. PATENT DOCUMENTS

| | | | |
|---|---|---|---|
| 10,931,107 B2* | 2/2021 | Finkel | H02J 3/06 |
| 11,113,534 B1* | 9/2021 | Conger | G06V 20/52 |
| 11,532,939 B1* | 12/2022 | Roberts | G06F 3/0416 |
| 11,798,104 B2* | 10/2023 | Rousis | H02J 3/004 |
| 2004/0077345 A1* | 4/2004 | Turner | H04W 28/06 |
| | | | 370/230.1 |
| 2007/0255116 A1* | 11/2007 | Mehta | G16H 40/67 |
| | | | 600/300 |
| 2010/0177070 A1* | 7/2010 | Zhu | G06F 1/3265 |
| | | | 340/815.4 |
| 2010/0177076 A1* | 7/2010 | Essinger | G09G 3/344 |
| | | | 345/212 |

OTHER PUBLICATIONS

"Siguard DSA—Dynamic security assessment", Siemens, 2020.
Katiraei, Farid et al.: "Microgrids Management—Controls and Operation Aspects of Microgrids", IEEE Power and Energy Magazine vol. 6, No. 3, May 1, 2008, pp. 54-65, XP011214084, ISSN: 1540-7977.
"Advanced Automation Applications", GE Grid Solutions, 2020.

* cited by examiner

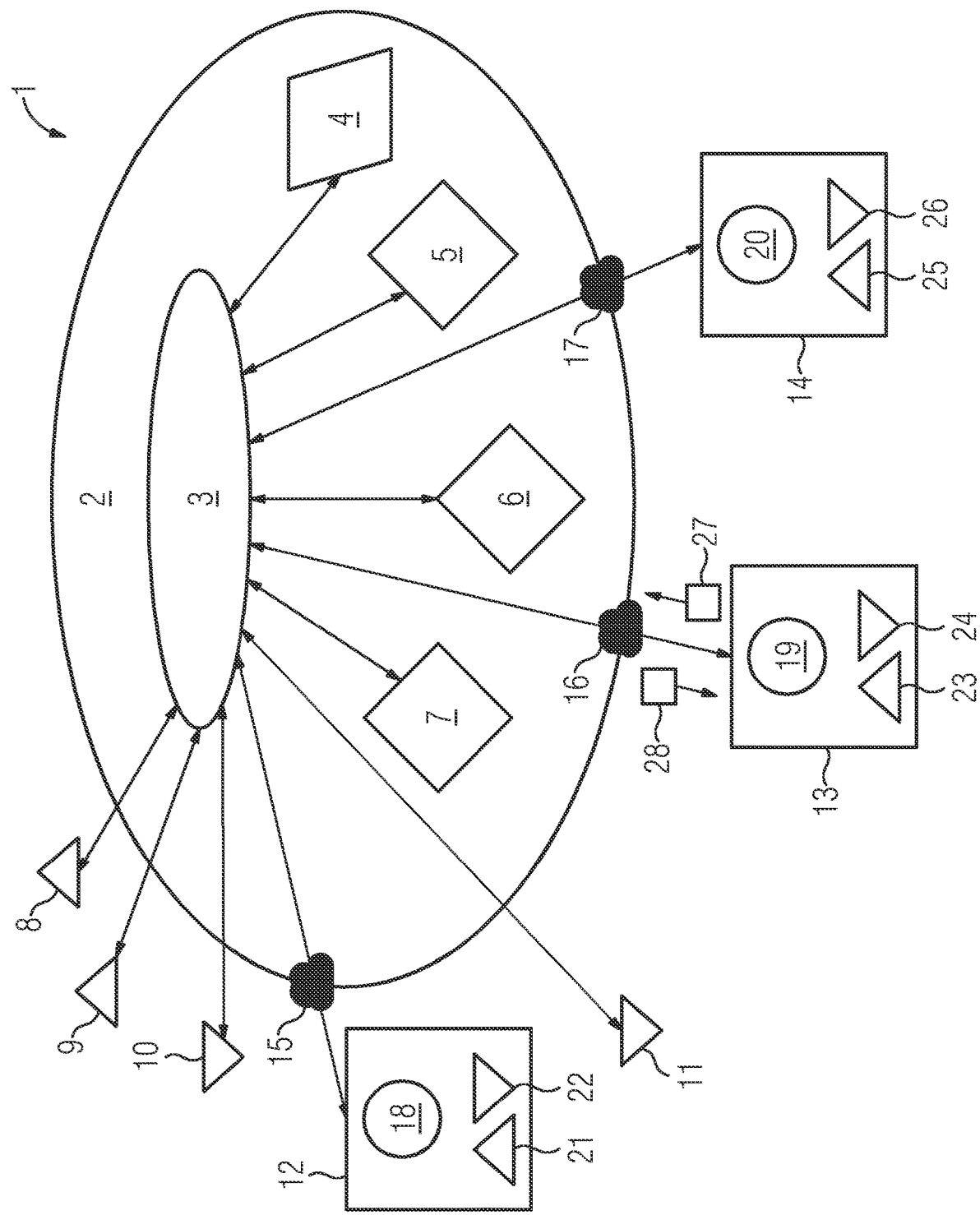

METHOD FOR CONTROLLING AN ENERGY NETWORK, AGENT DEVICE, NETWORK CONTROL ARRANGEMENT AND SYSTEM

CROSS-REFERENCE TO RELATED APPLICATION

This application claims the priority, under 35 U.S.C. § 119, of European Patent Application EP 21199147.6, filed Sep. 27, 2021; the prior application is herewith incorporated by reference in its entirety.

FIELD AND BACKGROUND OF THE INVENTION

The present invention relates to a method for controlling an energy network, an agent device for a subnetwork of an energy network, a network control arrangement for an energy network with a plurality of subnetworks, and a system having an agent device and a network control arrangement.

The product brochure "SIGUARD PDP—Grid Monitoring using Synchrophasors", Siemens AG 2021, discloses software for so-called "Wide Area Monitoring Protection and Control (WAMPAC)". In that case, phasor measurement data for current and voltage are captured by using so-called phasor measurement units and are evaluated in order to identify dynamic changes in an energy network centrally and in real time and, for example, to predict faults, for example a network frequency that deviates greatly from the nominal frequency. Furthermore, protective devices in the energy network can be optimized on the basis of the predicted faults in order to avoid failures.

The product brochure "SIGUARD DSA—Dynamic security assessment", Siemens AG 2020, discloses software for a so-called "dynamic security assessment". In that case, a network state is captured from a Supervisory Data Acquisition and Control System (SCADA), that is to say a network control center, as a starting point and is simulated over the future course of time. As a result, large-scale faults in network operation, for example, can be identified in advance on the basis of the simulation. Furthermore, possible countermeasures can be tested in the simulation before they are initiated in the real energy network.

The product brochure "GE Grid Solutions—Advanced Automation Applications", GE 2020, discloses a system having data concentrators which collect data from an assigned subnetwork and can transmit them to a central evaluation server for evaluation. The evaluation server has a so-called "Wide Area Monitoring Protection and Control" (WAMPAC) functionality in order to be able to monitor the network stability and to possibly calculate countermeasures in the event of faults.

WAMPAC systems are currently implemented on the basis of the hardware (sensors, actuators, communication devices) and software installed at the respective network operator and communicate directly with a central evaluation server. All devices and the actuators, for example flexible producers of renewable electrical energy (photovoltaics, wind power), must therefore typically belong to a single operator of the WAMPAC system in order to enable standardized central control. Although such WAMPAC systems use standardized protocols, for example IEC 60870-5-14, IEC 61850, etc., they require a large amount of manual set-up effort. Only then can interoperability be ensured if many different devices communicate with the central evaluation server. That results in a large amount of manual effort if the system is intended to be changed or expanded.

In particular, it is problematic if new capabilities, beyond the functionality provided by the operator (the methods are typically programmed according to the IEC 61131 standard), are intended to be added to the WAMPAC system. That may be, for example, a customer-specific calculation method, as can be created, for example, using the "Simulink" or "Matlab" mathematical software. Such new calculation methods have previously been preconfigured on the basis of complicated studies of the energy network, load flow calculations and faults.

SUMMARY OF THE INVENTION

It is accordingly an object of the invention, on the basis of known software-implemented methods, to provide a method for controlling an energy network, an agent device, a network control arrangement and a system, which overcome the hereinafore-mentioned disadvantages of the heretofore-known methods and devices of this general type and which can identify and eliminate faults during network operation even in the case of energy networks with a complex operator structure.

With the foregoing and other objects in view there is provided, in accordance with the invention, a method for controlling an energy network, having the steps of:
transmitting a respective offer message by using a plurality of agent devices, wherein each agent device is respectively assigned to a subnetwork of the energy network, and wherein each offer message indicates a subnetwork-specific measure for controlling the respective subnetwork and a period for which the subnetwork-specific measure is offered,
using a network control arrangement for:
receiving the offer messages, and
identifying an undesirable network state of the energy network;
selecting a subnetwork-specific measure from the plurality of subnetwork-specific measures; and
transmitting an acceptance message, by using the central network control arrangement, to that agent device which sent the offer message containing the selected subnetwork-specific measure.

An energy network in the sense of the invention is, for example, an electrical energy distribution or supply network having a plurality of subnetworks which supply individual regions or towns, for example. It may have different voltage levels, for example a high-voltage transmission level with a nominal voltage of more than 52 kV, a medium-voltage level with a nominal voltage of between 1 kV and 52 kV and a low-voltage level with a nominal voltage of less than 1 kV.

The term "control" denotes the process of controlling controllable equipment such as switching devices, gas-insulated switching devices, tap changers of transformers, network controllers etc. by using control commands transmitted by way of data communication. Furthermore, the process of controlling producers of electrical energy or consumers of electrical energy in order to control their respective supply or removal of electrical energy to/from the energy network may also be included, for example.

In the sense of the invention, an offer message and an acceptance message as well as a data telegram are, for example, digitally coded signal sequences, that is to say signal sequences formed of bit sequences, which are transmitted and received by using communication devices by way of a power line (so-called powerline communication), by way of copper data cables (Ethernet, etc.) or by way of optical waveguides. Radio connections (W-LAN, long-range radio, 2G, 3G, 4G (LTE), 5G, etc.) can also be used.

An agent device is, for example, a device which is locally installed in the subnetwork and has an electronic data processor and a data storage device such as a flash memory or a solid-state disk. Network analysis software, which for example uses software corresponding to the SIGUARD PDP mentioned at the outset as a measurement and evaluation application, is installed on the device, for example. However, an agent device may also be installed as a software component which is centrally installed in a cloud server or on an evaluation server and receives and evaluates measurement data from an assigned subnetwork.

In principle, the task of the agent devices is to carry out monitoring for the assigned subnetwork and, for example, to determine what power is available as a so-called spinning reserve or what power can be very quickly ramped up or down (photovoltaic installations, diesel generators, etc.).

For example, it is also possible to determine whether the power retrieved from the energy network for the subnetwork can be ramped down to zero in order to decouple the subnetwork and to then continue to operate it in the isolated mode. The monitoring and determination of the data can be updated e.g. regularly, for example every minute or every 5 hours. In this case, it is possible to take into account, for example, the time window for which the subnetwork-specific measures are offered. Customer-specific calculation methods and analysis methods can be implemented in an uncomplicated manner in the agent device.

The subnetwork may include, for example, a distribution network of the low-voltage level (nominal voltage of less than 1 kV), which distribution network is connected to a superordinate medium-voltage network (nominal voltage of between 1 kV and 52 kV). The agent device for the respective subnetwork may be assigned, for example, to the medium-voltage level and may be disposed in a local network station, for example.

For example, the functionality of the agent device may be set up as software on field devices already available in the energy network, for example SICAM A8000, a modular device series for telecontrol and automation applications, known from the brochure "SICAM A8000 Serie—Kompaktes, flexibles Fernwirk- and Automatisierungssystem [SICAM A8000 series—Compact, flexible telecontrol and automation system]", Siemens AG 2016, and/or on a protective device or may be installed in these devices as a software application. Furthermore, the software of the agent device can be implemented in so-called "Intelligent Electronic Devices (IEDs)."

A subnetwork-specific measure for controlling the respective subnetwork is, for example, load shedding for a consumer, a change of a transformation level of a transformer or regulation of the supply of a wind farm. A period for which the subnetwork-specific measure is offered is, for example, a duration from the present point in time for a few hours into the future, for example 5 hours. If the period has expired, the offered subnetwork-specific measure for controlling the respective subnetwork automatically loses its validity, for example. For example, a subnetwork-specific measure may be that a certain amount of electrical energy consumption (for example 2.3 MW) is released by load shedding or is not consumed. The offer may apply for 5 hours, for example. Accordingly, it is useful, for example, for a selected subnetwork-specific measure to be implemented within the period.

An undesirable network state of the energy network can be identified by using the network control arrangement, for example using software which corresponds, in terms of its functionality, to the SIGUARD DSA mentioned at the outset. In this manner, the received measures for the subnetworks can be assessed, wherein the entire energy network is simulated. In addition, it is therefore also possible to define possibly required countermeasures for stabilizing the energy network and for avoiding blackouts. Subnetwork-specific measures which are intended to be implemented for the energy network are selected on the basis of the assessment. In this case, implement means, for example, that control commands are transmitted to controllable equipment etc. For example, the above-mentioned measure can be selected in order to use 2.3 MW as the primary reserve or spinning reserve. The actual load shedding can be carried out, for example, by the relevant agent device, with the result that the network control arrangement does not need to completely know the network topology of the subnetwork or the load conditions.

The basic concept of the invention is based on the fact that a central WAMPAC platform, as the network control arrangement, combines the different wide-area control modules of energy networks. The platform may be operated in parallel with a control center, for example, and can regularly receive a present network state and/or a network state prediction from the latter. In this case, the WAMPAC platform includes functionalities in order to act as a broker for the agent devices, for example applications for evaluation and network control and a network model. It is connected, by way of data communication, to applications which provide simulations, monitoring and control functions and countermeasures for ensuring the network stability in the event of faults. This partially decentralized control achieves a substantial simplification in comparison with previous systems and it is also easier to also incorporate controllable equipment from different manufacturers into a common control regime by using the agent devices.

The specifications of the application rule VDE-AR-N 4142 can be implemented by using the network control arrangement. The application rule states that so-called last measures are automatically implemented in the event of faults and hazards if there is not sufficient time for measures manually selected by an engineer of the control center. Specifications of the European "Network Code on Emergency and Restoration (NC ER)" for underfrequency-dependent load shedding are therefore effectively implemented in Germany. The invention can be used to reduce effort and costs involved in retrofitting the field devices and the control center for the energy network.

The platform communicates with agent devices or field devices such as remote terminal units (RTUs), protective devices, phasor measurement units (PMUs) by using interfaces in order to receive measurement data such as voltage values, current values and phasor information. Control commands can also be transmitted from the platform to field devices, for example in order to directly implement countermeasures in the event of network stability problems in the subnetwork. However, the countermeasures would be generally implemented by the relevant agent device.

The network control arrangement or platform may have standard application software such as the Siguard PDP mentioned at the outset or customer-specific applications, for example Simulink applications, big data analytics software and/or power quality analysis software.

In contrast to previous systems, the platform with central intelligence makes it possible to combine various solutions which are used by different manufacturers and/or operators in the field. For example, different operators of microgrids or virtual power plants can be incorporated into the WAMPAC system by using the agent devices. For this purpose, it is only necessary for the operator to set up a decentralized agent device in software and/or hardware for the operator's area of responsibility in order to communicate, for example, measurement data, load conditions, active power reserves, spinning reserves, load shedding plans and also possible countermeasures in the event of stability problems in the energy network. Measurement data and actuators may also be incorporated into the WAMPAC system.

On the basis of all this information and the subnetwork-specific measures offered by the agent devices, the central intelligence can carry out simulations of the behavior of the energy network, wherein the type of simulations is matched to the type of activated application programs (for example voltage band control) and includes, for example, countermeasures such as load shedding.

The WAMPAC platform is continuously updated in this case by checking which devices, for example sensors, actuators and agent devices, are logged on and are participating in the system. The system therefore knows when devices have failed or should be disconnected for maintenance.

In summary, it can be stated that the combination of different providers by using flexible adapters—the agent devices—can provide partially decentralized and therefore more robust control of energy networks. The operator of the WAMPAC system need not know and monitor all details of every subnetwork, but rather can leave this management to the relevant agent device.

In one preferred embodiment of the method according to the invention, the selected subnetwork-specific measure is implemented by the agent device assigned to the subnetwork. This is an advantage because the network control arrangement in this variant does not itself need to know and manage the controllable equipment present in the subnetwork, but rather this can be carried out in a decentralized manner by using the agent device.

In a further preferred embodiment of the method according to the invention, the selected subnetwork-specific measure is implemented by the network control arrangement for the assigned subnetwork. This is an advantage because the measure can be implemented directly and immediately.

In a further preferred embodiment of the method according to the invention, all received subnetwork-specific measures are prioritized by using the network control arrangement in such a manner that subnetwork-specific measures which greatly influence elimination of the undesirable network state are preferably selected. This is an advantage because, in this manner, countermeasures can be selected and implemented quickly and in an uncomplicated manner in the event of problems with the network stability.

In a further preferred embodiment of the method according to the invention, the selection from all received subnetwork-specific measures is carried out by using the network control arrangement in such a manner that a subgroup of subnetwork-specific measures which have an expected influence on elimination of the undesirable network state is compiled, and a subnetwork-specific measure is selected from the subgroup at random. This variant has the advantage that non-discrimination for the subnetworks and their operating companies is automatically implemented at random. This is because there is a legal requirement not to give preference to providers in some countries, for example Germany.

In a further preferred embodiment of the method according to the invention, a plurality of subnetwork-specific measures with overlapping periods are transmitted with at least one offer message by using the agent devices, wherein an indication of an expected effect of the subnetwork-specific measure on the energy network is added for each subnetwork-specific measure. The term "overlapping periods" means that the plurality of measures are all offered or valid at least for a certain period of time, with the result that they can be actually checked as alternatives to the solution to the problem by the network control arrangement in a specific fault situation. This is an advantage because, for example, a first subnetwork-specific measure which can be offered by the agent device for the subordinate subnetwork is particularly suitable for frequency stabilization (and is therefore provided with a first indication), whereas a second subnetwork-specific measure is particularly suitable for reactive power compensation (and is therefore provided with a second indication). This preprocessing makes it easier for the network control arrangement to select measures depending on the network state. Standardized indications can be used, with the result that the incoming measures can be clustered in a useful manner by the network control arrangement, specifically on the basis of the indication depending on the application and/or geographically or topologically on the basis of the assignment of the agent device to a subnetwork.

In a further preferred embodiment of the method according to the invention, subnetwork-specific measurement data and/or topology information and/or photovoltaic performance data and/or performance data of thermal generators is/are transmitted to the network control arrangement by using the agent devices, in each case with a data telegram. This is an advantage because the network control arrangement is able in this manner to independently carry out calculations for the network state of the overall energy network. A so-called dynamic equivalent, that is to say an aggregated or simplified mathematical model of the subnetwork assigned to the respective agent device, is preferably transmitted to the network control arrangement.

On the basis of known field devices, the object of the invention is also to specify an agent device for controlling an energy network, which agent device can be used to identify and eliminate faults during network operation even in the case of energy networks with a complex operator structure.

With the objects of the invention in view, there is also provided an agent device for a subnetwork of an energy network, having:
  a subnetwork control device which is configured to determine a subnetwork-specific measure for controlling the subnetwork and a period for which the subnetwork-specific measure is offered, and
  a first communication device which is configured to transmit an offer message containing the subnetwork-specific measure and the period.

The same advantages as explained at the outset for the method according to the invention analogously arise for the agent device according to the invention and its embodiments.

On the basis of known control center devices, the object of the invention is also to specify a network control arrangement for controlling an energy network, which network control arrangement can be used to identify and eliminate faults during network operation even in the case of energy networks with a complex operator structure.

With the objects of the invention in view, there is furthermore provided a network control arrangement for an energy network with a plurality of subnetworks, having:

a second communication device for receiving offer messages and for transmitting an acceptance message to that agent device which sent the offer message containing a selected subnetwork-specific measure, and a control device which is configured to select a subnetwork-specific measure from the plurality of subnetwork-specific measures.

Preferred embodiments are specified in the dependent claims. The same advantages as explained at the outset for the method according to the invention analogously arise for the network control arrangement according to the invention and its embodiments.

On the basis of known systems for controlling energy networks, the object of the invention is also to specify a system for controlling an energy network, which system can be used to identify and eliminate faults during network operation even in the case of energy networks with a complex operator structure.

With the objects of the invention in view, there is concomitantly provided a system having:

an agent device according to the invention, and a network control arrangement according to the invention.

The same advantages as explained at the outset for the method according to the invention analogously arise.

Other features which are considered as characteristic for the invention are set forth in the appended claims.

Although the invention is illustrated and described herein as embodied in a method for controlling an energy network, an agent device, a network control arrangement and a system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE FIGURES

The FIGURE is a block diagram showing a preferred exemplary embodiment of the invention.

DETAILED DESCRIPTION OF THE INVENTION

Referring now in detail to the single FIGURE of the drawing, there is seen a system 1 for controlling an energy network including a central network control arrangement 2 having a control device 3 which has data processor resources and data storage resources (not illustrated). The network control arrangement 2 also has three software applications 5, 6, 7. The software application 5 monitors compliance with predefined voltage limits, for example, the software application 6 monitors transient stability and the software application 7 is used to simulate the network state, for example. A model device 4 is also provided in order to provide a network model. Interfaces 15, 16, 17 having second communication devices are provided for communication with the agent devices, in order to be able to receive offer messages 27 and to transmit acceptance messages 28.

The network control arrangement 2 can receive measured values from measurement devices 8, 9, for example remote terminal units, phasor measurement units or intelligent electronic devices, directly from the subnetworks. In addition, control commands can also be directly transmitted to actuators 10, for example switchgear, high-voltage direct-current transmission installations (HVDC) or static Var compensators (SVC).

Three agent devices 12, 13, 14 are shown for a respective assigned subnetwork and can interchange digital messages with the computer device by way of data communication (indicated by bidirectional arrows). Each agent device has a subnetwork control device 18, 19, 20 which is configured to determine a subnetwork-specific measure for controlling the subnetwork and a period for which the subnetwork-specific measure is offered. A first communication device (not illustrated) is also respectively provided and is configured to transmit an offer message 27 containing the subnetwork-specific measure and the period or to receive an acceptance message 28 for the subnetwork-specific measure. The subnetwork control device is configured to implement the subnetwork-specific measure for the subnetwork. For this purpose, it transmits control commands to controllable equipment, producers and consumers of electrical energy.

The agent devices 12, 13, 14 are assigned, for example, to a device in a local network station or to a control device for a virtual power plant (VPP).

The subnetwork control devices 18, 19, 20 are configured to collect subnetwork-specific measurement data and/or topology information and/or photovoltaic performance data and/or performance data of thermal generators and to transmit the information and/or data with a data telegram by using the first communication device.

Furthermore, the agent devices 12, 13, 14 may process measured values 21, 23, 25 from measurement devices from the respective subnetwork. These are, for example, remote terminal units, phasor measurement units or intelligent electronic devices. In addition, control commands can also be directly transmitted to actuators 22, 24, 26, for example switchgear, high-voltage direct-current transmission installations (HVDC) or static Var compensators (SVC).

The invention claimed is:

1. A method for controlling an energy network, the method comprising:

using a plurality of agent devices to transmit a respective offer message, each agent device being respectively assigned to a subnetwork of the energy network, and each offer message indicating a plurality of subnetwork-specific measures for controlling the respective subnetwork and a plurality of overlapping periods for which the plurality of subnetwork-specific measures is offered, wherein an indication of an expected effect of the subnetwork-specific measure on the energy network for each of the plurality of subnetwork-specific measures is added;

using a network control arrangement for:

receiving the offer messages, and identifying an undesirable network state of the energy network;

selecting a subnetwork-specific measure from the plurality of subnetwork-specific measures; and using the central network control arrangement to transmit an acceptance message to the agent device having sent the offer message containing including the selected subnetwork-specific measure.

2. The method according to claim 1, which further comprises using the agent device assigned to the subnetwork to implement the selected subnetwork-specific measure.

3. The method according to claim 1, which further comprises using the network control arrangement for the assigned subnetwork to implement the selected subnetwork-specific measure.

4. The method according to claim 1, which further comprises using the network control arrangement to prioritize all received subnetwork-specific measures to select subnetwork-specific measures influencing elimination of the undesirable network state.

5. The method according to claim 1, which further comprises carrying out the selection from all received subnetwork-specific measures by using the network control arrangement to compile a subgroup of subnetwork-specific measures having an expected influence on elimination of the undesirable network state, and selecting a subnetwork-specific measure from the subgroup at random.

6. The method according to claim 1, which further comprises transmitting at least one of subnetwork-specific measurement data or topology information or photovoltaic performance data or performance data of thermal generators to the network control arrangement in a data telegram by using the agent devices.

7. An agent device for a subnetwork of an energy network, the agent device comprising:
a subnetwork control device configured to determine a plurality of subnetwork-specific measures for controlling the subnetwork and a plurality of overlapping periods, each specifying a period for which a respective one of the plurality of subnetwork-specific measures is offered; and
a first communication device configured to transmit an offer message including the plurality of subnetwork-specific measures with the overlapping periods, wherein for each one of the plurality of subnetwork-specific measures, an indication of an expected effect of one of the plurality of subnetwork-specific measures on the energy network is added.

8. The agent device according to claim 7, wherein:
said first communication device is configured to receive an acceptance message for for a selected one of the plurality of subnetwork-specific measures; and
said subnetwork control device is configured to implement the selected one of the plurality of subnetwork-specific measures.

9. The agent device according to claim 7, wherein:
said subnetwork control device is configured to collect at least one of subnetwork-specific measurement data or topology information or photovoltaic performance data or performance data of thermal generators; and
said first communication device is configured to transmit the at least one of subnetwork-specific measurement data or topology information or photovoltaic performance data or performance data of thermal generators with a data telegram.

10. A network control arrangement for an energy network with a plurality of subnetworks, the network control arrangement comprising:
a second communication device for receiving offer messages and for transmitting an acceptance message to an agent device having sent an offer message including a plurality of subnetwork-specific measures with overlapping periods, wherein an indication of an expected effect of each one of the subnetwork-specific measures on the energy network is added; and
a control device configured to select a subnetwork-specific measure from the plurality of subnetwork-specific measures.

11. The network control arrangement according to claim 10, wherein said control device is configured to implement the selected subnetwork-specific measure.

12. The network control arrangement according to claim 10, wherein said control device is configured to prioritize all received subnetwork-specific measures for selecting subnetwork-specific measures influencing elimination of an undesirable network state.

13. The network control arrangement according to claim 10, wherein said control device is configured to carry out the selection from all received subnetwork-specific measures to compile a subgroup of subnetwork-specific measures having an expected influence on elimination of tan undesirable network state, and a subnetwork-specific measure is selected from the subgroup at random.

14. A system, comprising:
an agent device for a subnetwork of an energy network, the agent device including:
a subnetwork control device configured to determine a a plurality of subnetwork-specific measures for controlling the subnetwork and a plurality of overlapping periods, each specifying a period for which a respective one of the plurality of subnetwork-specific measures is offered; and
a first communication device configured to transmit an offer message including a plurality of subnetwork-specific measures with overlapping periods, wherein an indication of an expected effect of each one of the subnetwork-specific measures on the energy network is added; and
a network control arrangement for the energy network with a plurality of subnetworks, the network control arrangement including:
a control device configured to select a subnetwork-specific measure from the plurality of subnetwork-specific measures; and
a second communication device for receiving offer messages and for transmitting an acceptance message to an agent device having sent an offer message a including the selected subnetwork-specific measure.

* * * * *